United States Patent [19]
Pierrat

[11] Patent Number: 5,345,349
[45] Date of Patent: Sep. 6, 1994

[54] MAGAZINE LATCHING AND EJECTION MECHANISM FOR A CASSETTE AUTOLOADER

[75] Inventor: Michel A. Pierrat, Boulder, Colo.

[73] Assignee: Encynova Inc., Boulder, Colo.

[21] Appl. No.: 909,061

[22] Filed: Jul. 2, 1992

Related U.S. Application Data

[63] Continuation-in-part of Ser. No. 727,647, Jul. 9, 1991, Pat. No. 5,184,260, which is a continuation-in-part of Ser. No. 555,576, Jul. 19, 1990, abandoned, and a continuation-in-part of Ser. No. 679,910, Apr. 3, 1991, abandoned.

[51] Int. Cl.$^5$ .................... G11B 23/04; G11B 15/68
[52] U.S. Cl. ........................................ 360/92; 369/36
[58] Field of Search ............... 360/92, 98.06; 369/34, 369/36, 191, 192; 414/932

[56] References Cited

U.S. PATENT DOCUMENTS 5,014,258  5/1991  Takemasa et al. .................. 369/192
5,153,862  10/1992  Taylor et al. ........................ 360/92

*Primary Examiner*—Robert S. Tupper
*Attorney, Agent, or Firm*—E. T. Barrett

[57] ABSTRACT

In an autoloader having a tape deck for reading and recording on magnetic tape cassettes, such as are used for computer data back-up, a removable magazine for holding a number of cassettes in which a locking and ejection mechanism locks the magazine in position in the autoloader and permits its automatic or manual release and ejection from the tape deck. The magazine has no protrusions on its side, top or bottom surfaces that would interfere with easy insertion into and removal from the autoloader and which would, also, interfere with simple and easy storage of the magazines in a back-up facility. Any size magazine can be inserted in the autoloader without modification of the autoloader. A first latch member engages a receptive space in the magazine when it is partially inserted and stores ejection energy. A second latch member locks the magazine in position when it is fully inserted. The magazine may be released from the autoloader automatically under electronic control or manually by physically releasing the second latch. The stored energy then ejects the magazine a sufficient distance to enable an operator to remove it by hand.

8 Claims, 3 Drawing Sheets

U.S. Patent  Sep. 6, 1994  Sheet 1 of 3  5,345,349

MAGAZINE LATCHING AND EJECTION MECHANISM FOR A CASSETTE AUTOLOADER

REFERENCE TO RELATED APPLICATIONS

This application is a continuation-in-part of application Ser. No. 07/727,647 filed Jul. 9, 1991 entitled MAGNETIC TAPE DRIVE WITH INTEGRAL MULTIPLE-CASSETTE REMOVABLE MAGAZINE now U.S. Pat. No. 5,184,260, which is a continuation-in-part of applications Ser. No. 07/555,576 filed Jul. 10, 1990 and Ser. No. 07/679,910, filed Apr. 3, 1991 both now abandoned.

BACKGROUND OF THE INVENTION

1. Field of the Invention

This invention relates to an autoloader having a removable magazine for storing and retrieving magnetic tape cassettes and more particularly to a mechanism for locking the magazine in position in the autoloader and permitting manual or automatic release and ejection of the magazine.

2. Description of Related Art

Various kinds of storage and retrieval systems have been devised for magnetic tape cassettes. In most previous devices using a magazine for holding a number of cassettes, external protrusions interfere with efficient loading and storage of the magazines. In some systems, for example, as shown in U.S. Pat. No. 4,071,857 to Whitney et al., cassettes are fed from a first magazine into a tape deck and from the tape deck into a separate magazine. No means for locking either of the magazines in an autoloader is disclosed.

SUMMARY OF THE INVENTION

A magazine, which may hold 1, 4, 6, 8, or any other number of magnetic tape cassettes, is removably positioned in an autoloader from which individual tapes are removed automatically and inserted into a tape deck, then later removed from the tape deck and returned to the magazine. The magazine is removable for efficient back-up storage when the desired amount of data has been recorded on the cassettes. A locking and ejection mechanism locks the magazine in position in the autoloader and permits its automatic or manual release and ejection from the autoloader. The magazine has no protrusions on its side, top or bottom surfaces that would interfere with easy insertion into and removal from the autoloader and which would, also, interfere with simple and easy storage of the magazines in a back-up facility. A magazine of any desired cassette capacity can be inserted in the autoloader without modification of the autoloader. A pawl member engages a receptive space in the magazine when it is partially inserted and stores ejection energy. A latch member locks the magazine in position when it is fully inserted. The magazine may be released from the autoloader automatically under electronic control or manually by physically releasing the second latch. The stored energy then ejects the magazine a distance sufficient to enable an operator to remove it by hand.

DESCRIPTION OF THE PREFERRED EMBODIMENT

Figure 1:
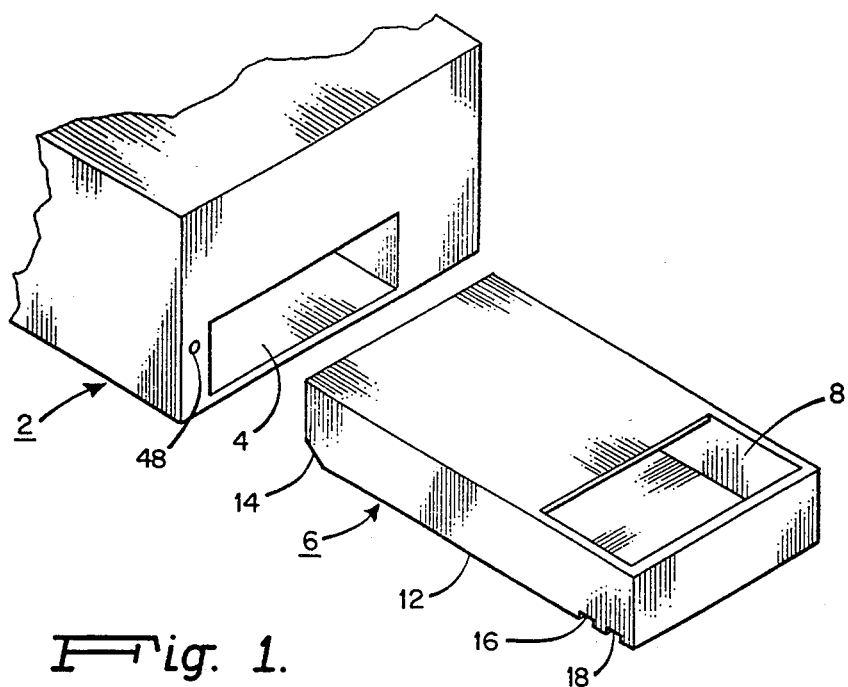
FIG. 1 is a partial perspective view of an autoloader and an adjacent magazine ready for loading into the autoloader.
Figure 2:
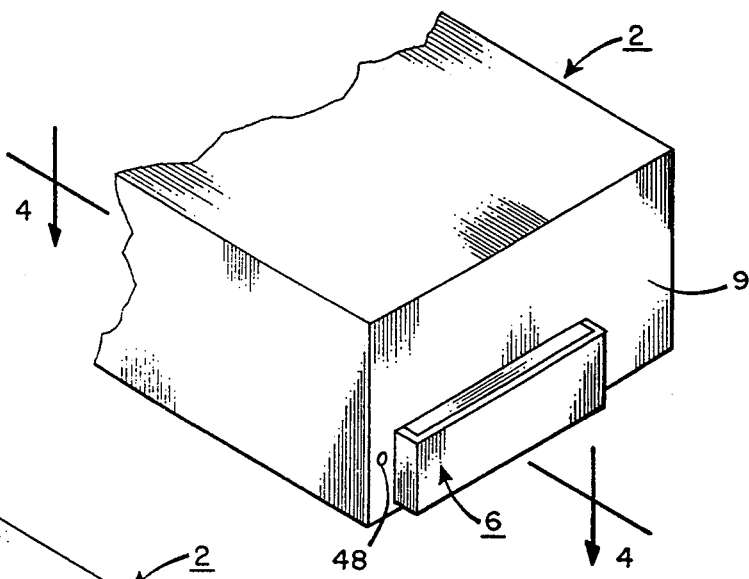
FIG. 2 is a perspective view similar to FIG. 1 in which the magazine is partially inserted into the autoloader.

A shown in FIG. 1, an autoloader, generally indicated at 2, has a front opening 4 for receiving a magazine, generally indicated at 6, which may hold 1, 4, 6, 8 or any other number of cassettes. The autoloader 2 may be the same as that described in detail in the application Ser. No. 07/767,647 referenced above, which description is incorporated herein by reference. The magnetic cassettes, not shown, may be identical with those commonly used in the trade for recording back-up computer data on magnetic tape or for recording audio signals or other information. These cassettes are also described more fully in the earlier application. The cassettes are loaded into and removed from the magazine 6 through an opening 8 in the upper surface of the magazine.

The bottom longitudinal edge 12 of the magazine 6 has three recesses: a tapered recess 14 at the rear of the magazine and two recesses 16 and 18 near the front part of the magazine. Irrespective of the number of cassettes the magazine is designed to accommodate, the recess 14 is always at the rear end, or at a constant distance from the rear end, and the other two recesses 16 and 18 are always the same distance apart and a constant distance from the front of the magazine. By this means magazines of different capacities may be interchanged without alteration of the autoloader.

Figure 4:
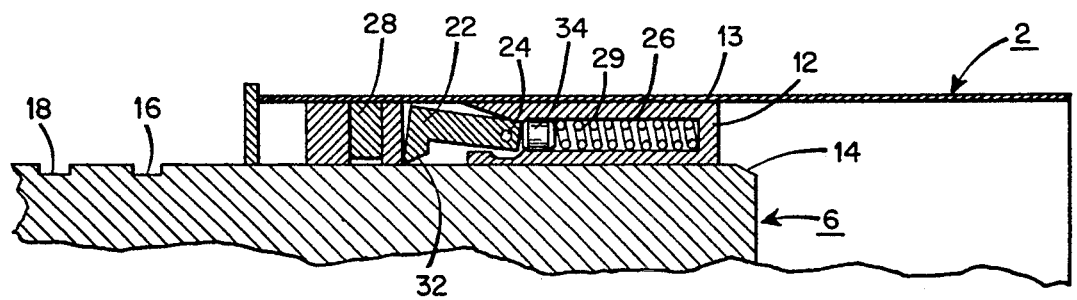
FIG. 4 is a partial sectional view along line 4—4 of FIG. 2 in which the magazine is partially inserted into the autoloader.
Figure 5:
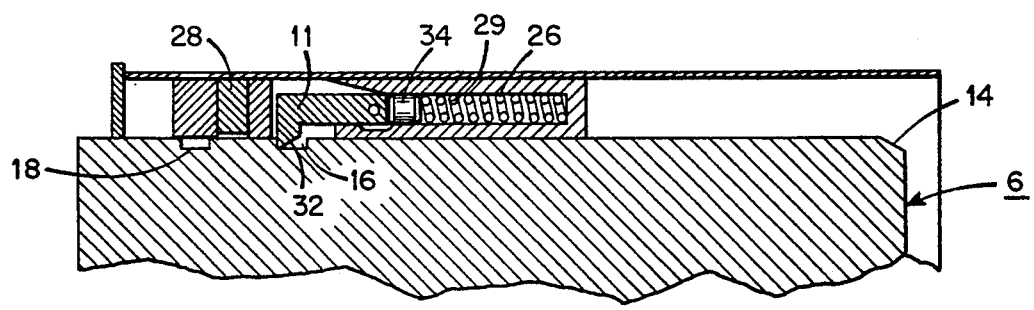
FIG. 5 is a view similar to FIG. 4 in which the magazine is positioned somewhat further into the autoloader.
Figure 6:
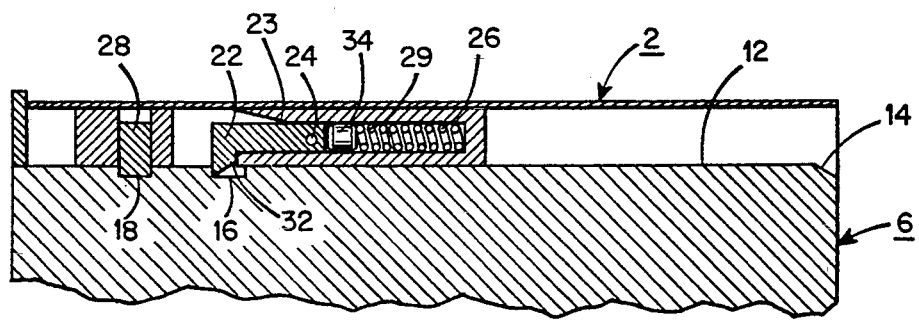
FIG. 6 is view similar to FIG. 5 in which the magazine is fully enclosed in the autoloader.

FIGS. 4, 5 and 6 illustrate the general operation of the mechanism. As illustrated by FIG. 4, when the magazine 6 is first partially inserted into the autoloader 2 the tapered recess 14 pivots a pawl 22 about a pin 24 to move the end of the pawl 22 from the path of the magazine 6. When the magazine 6 is inserted farther into the autoloader 2, as shown by FIG. 5, the pawl 22, propelled by a compression spring 26, enters the recess 16. Further movement of the magazine 6, causes the wall of the recess 16 to transport the pawl 22 toward the right, as viewed in FIG. 5, to the position shown in FIG. 6. At this point, a locking latch 28 enters the recess 18 locking the magazine in its final position.

The base portion of the pawl 22 has been moved into a longitudinal opening 23, which may be either rectangular or circular in cross section, that prevents the pawl 22 from being disengaged from the recess 16 while the magazine is fully inserted. The magazine is now firmly locked into the autoloader and remains fixed until released by movement of the locking latch 28 from the recess 18.

When the latch 28 is withdrawn from the recess 18, the spring 26 in the opening 29 moves the pawl 22 toward the left, as viewed in FIG. 6, to force the magazine a short distance in the same direction. The distance the magazine is moved by the pawl 22 is sufficient to enable an operator to grasp and withdraw the magazine. As the magazine is withdrawn, one wall of the recess 16 impinges on a tapered end section 32 of the pawl 22 causing it to pivot about the pin 24 and move from the recess.

To provide an angular bias for the pawl 22 in the direction of the magazine 6, the end section of the pawl 22 adjacent the pin 24 extends perpendicular to the longitudinal axis of the pawl and abuts the end surface of a spacer 34 which has one end surface abutting the end of pawl 22 and the other end engaging the compression spring 26. The pin 24 is carried by the pawl 22. This arrangement biases the longitudinal axis of the pawl 22 in alignment with the longitudinal axis of the spring 26 so that when the pawl 22 is rotated clockwise, as shown in FIG. 4, it is biased in the direction of the magazine and enters the recess 16 when the magazine 6 reaches the appropriate position.

Figure 7:
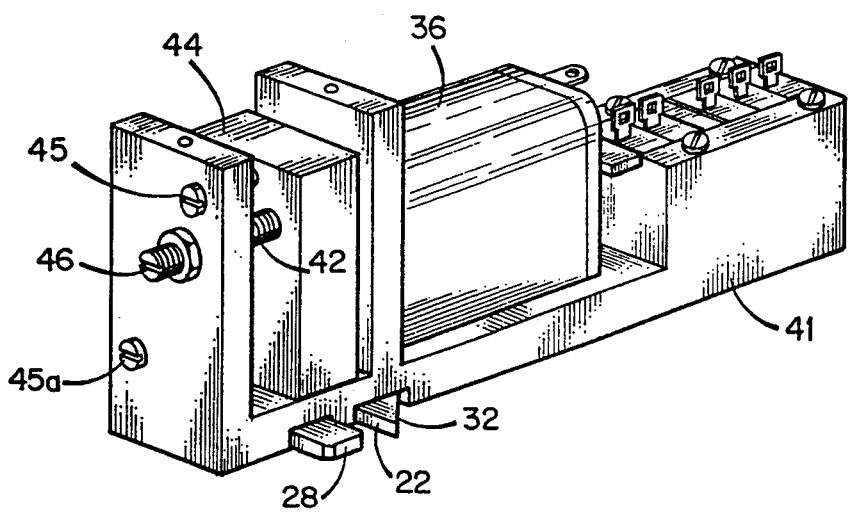
FIG. 7 is a perspective view of a drive mechanism for actuating the locking and ejection mechanisms.
Figure 8:
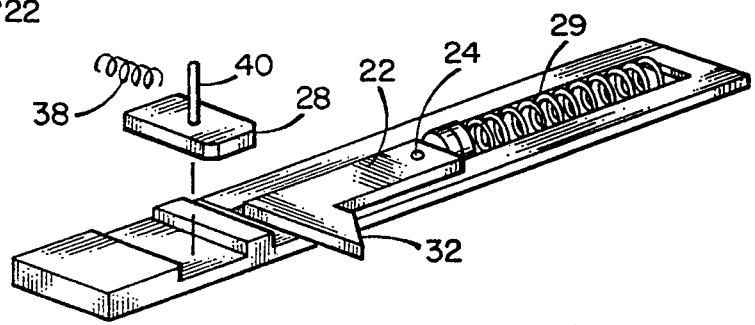
FIG. 8 is a partial exploded view showing certain components of the driving and locking mechanism of FIG. 7.
Figure 9:
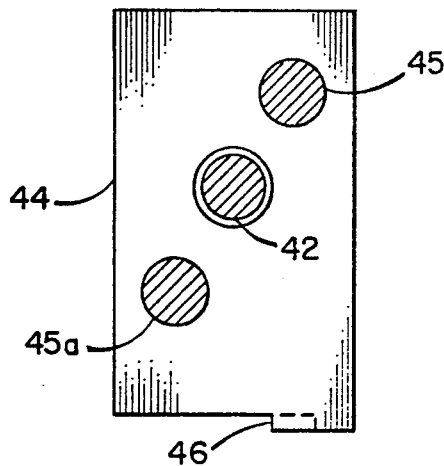
FIG. 9 is an end view of a latch actuating control nut.
Figure 10:
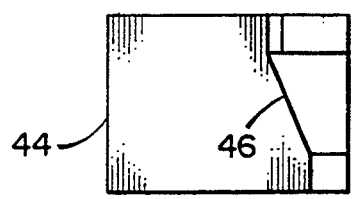
FIG. 10 is a bottom view of the control nut of FIG. 9.

The locking latch 28 is under control of an automatic system which may be a conventional electronic circuit (not shown) that actuates an electric motor 36 (FIG. 7) to withdraw the latch 28 from the recess 18. The latch 28 is biased in the direction of the recess 18 by a spring 38 (FIG. 8) that engages a pin 40 extending upwardly from the latch 28. The motor 36 and its associated mechanisms are mounted on a base 41 that forms an integral part of the enclosure of the autoloader 2. When the magazine 6 is to be removed, the motor 36 is actuated and rotates a screw 42 to move a control nut 44, in threaded engagement with the screw 42, toward the right as viewed in FIG. 7. The nut 44, which is slidably supported on the base 41 by a pair of rods 45 and 45a, carries a tapered surface 46 (FIG. 10) that engages the pin 40 of the locking latch 28 and forces it from the recess 18. To permit manual removal of the magazine, as in the event of a malfunction or a power failure, the end of the screw 42 is slotted, as indicated at 46, so that a screw driver may be inserted into an opening 48 (FIG. 1) in the front of the autoloader 2. By rotation of the screw 42, the nut 44 is driven to release the locking latch 28 and permit the spring loaded pawl 22 to eject the magazine.

Figure 3:
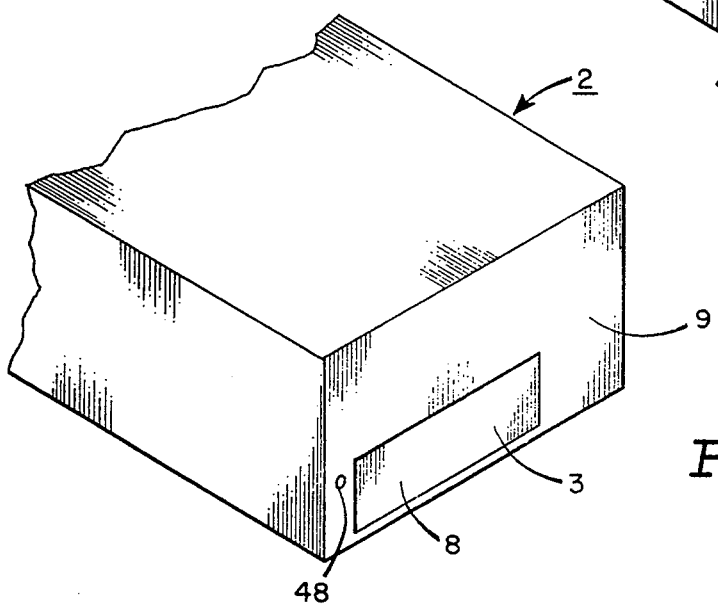
FIG. 3 is a similar perspective view with the magazine fully inserted into the autoloader.

As shown in FIG. 3, the magazine is completely enclosed within the autoloader, which may be designed to fit within the usual 5¼ inch form factor provided for computer peripherals. The magazine may be configured to move even further into the autoloader so that a sliding door can be positioned in front of the magazine.

I claim:

1. In an autoloader having a removable magazine for holding a plurality of cassettes, the combination comprising
    a movable pawl mounted on said autoloader and rotatably movable between an engagement position wherein said pawl engages said magazine. and a release position wherein said pawl is released from said magazine,
    receiving means forming part of the magazine for engaging said pawl when in said engagement position,
    means responsive to insertion of said magazine into said autoloader for moving said pawl into said engagement position and for moving said pawl in linear concert with said magazine in a direction generally parallel with the direction of movement of said magazine,
    energy storage means coupled to said pawl and responsive to said movement of said magazine for storing energy when said magazine is inserted into said autoloader,
    means for locking said magazine in said autoloader,
    means for releasing said magazine from said autoloader including
        means for releasing said lock thereby to release said energy and cause said pawl to move in the direction of movement of said magazine, to cause partial ejection of said magazine.

2. The combination as claimed in claim 1 wherein
    said energy storage means is a spring bias means urging said pawl in a direction to engage said receiving means.

3. The combination as claimed in claim 2 wherein
    said receiving means is a recess in said magazine, and
    said magazine includes a tapered surface for engaging said pawl during insertion of said magazine into said autoloader and forcing said pawl from the path thereof.

4. The combination as claimed in claim 1 wherein said locking means includes
    a latch mounted on said autoloader,
    latch receiving means forming part of said magazine for locking said magazine in position in said autoloader, and
    means for biasing said latch toward engagement with said latch receiving means, and including
    releasing means for removing said locking means from engagement with said latch receiving means thereby to permit said pawl to eject said magazine.

5. The combination as claimed in claim 4 wherein
    said releasing means for removing said locking means from said engagement with said latch receiving means includes
        an electric motor,
        a screw drive engaging said motor,
        a nut driven by said screw drive, and
        means responsive to the position of said nut for disengaging said latch from said latch receiving means.

6. The combination as claimed in claim 5 including
    means independent of said motor for manually disengaging said latch from said latch receiving means.

7. The combination as claimed in claim 6 wherein
    said means for manually disengaging said latch includes means for manually operating said screw drive.

8. In an autoloader having a removable magazine capable of holding one or more cassettes, the combination comprising
    a retractable and linearly movable pawl slideably mounted on said autoloader,
    receiving means forming part of said magazine for engaging said pawl,
    means for supporting said pawl and allowing it to retract in a direction perpendicular to the direction of motion of said magazine while being inserted into said autoloader,
    means for transporting said pawl along a linear path substantially parallel with the direction of motion of said magazine in response to the movement of said magazine during insertion into said autoloader, energy storage means coupled to said pawl and responsive to movement of said magazine for storing mechanical energy when said magazine is inserted into said autoloader, and means for releasing said mechanical energy to cause said pawl to move along said linear path from said second position to said first position thereby to eject said magazine.

* * * * *